Sept. 26, 1967                A. H. RICE ET AL                3,343,680
FILTER AND METHOD OF MAKING SAME
Filed Feb. 17, 1964

ARCHIE H. RICE
WALTER R. CONLEY
INVENTORS.

BY
BUCKHORN, BLORE, KLARQUIST & SPARKMAN
ATTORNEYS

United States Patent Office 3,343,680
Patented Sept. 26, 1967

3,343,680
FILTER AND METHOD OF MAKING SAME
Archie H. Rice and Walter R. Conley, Corvallis, Oreg., assignors to General Services Company, Corvallis, Oreg., a corporation of Oregon
Filed Feb. 17, 1964, Ser. No. 345,204
6 Claims. (Cl. 210—263)

ABSTRACT OF THE DISCLOSURE

A filter bed of three different filter media the particles of which being of different specific gravities and sizes. The media are intermixed in such a manner that the number of particles continually increases in the direction of flow of the fluid being filtered.

---

This invention relates to an improved and novel filter and method of construction of same for use in filtering water, sewage and other liquids.

The rapid sand filter is well-developed, principally for use in filtration of water. There are two broad classes of rapid sand filters in general use today. The first class is made of one single material, either sand or anthracite coal. The range of particle sizes in use is from 0.3 millimeter to 0.8 mm. effective size. This filter is by far the most popular and most widely used. A second class of filter is the dual media filter made of sand and anthracite coal in the same filter bed.

The first class of filters, single media, is most often used when the applied turbidity load is very low. Under these conditions, the filters are satisfactory. When the applied turbidity load increases, these filters are unsatisfactory.

The second class of filter, dual media, has been used to handle increased turbidity loads and increase filter runs. However, wide experience has shown that these filters have limitations. The upper turbidity limit of these filters depends on the flow rate desired, length of filter run, and the freedom from flow surges. If flow rates are fairly low (2 g.p.m. per square foot) and short filter runs can be tolerated, and there is no surge in flow, these filters have handled as much as 300 p.p.m. of turbidity satisfactorily. (That is, turbidity applied directly to the filters.) However, if the flow rates are high (5 g.p.m. per square foot or so), and there is a change in flow or surges in flow, the upper limit is near 100 p.p.m. applied turbidity. In contrast, under comparable flow and effluent turbidity conditions, the filters of the first class made of one material only, either sand or coal, cannot handle more than approximately 25 to 50 p.p.m. of applied turbidity at 5 g.p.m. per square foot.

If the range of applied turbidity loads can be increased substantially, there will be a significant economic advantage. It will make possible increases in flow at existing plants. It will also make it possible to extend the range of operation without settling basins in new plants. As flocculation and settling facilities represent a major share of the cost of a filter plant, the overall cost can be very much reduced by the application of better filters.

It is an object of this invention to provide filters which give longer filter runs.

A further object is to supply filters which can function satisfactorily with higher turbidity loads.

An additional object is to provide a filter which will be relatively insensitive to rapid changes in flow.

Another object is to provide a filter which will make it possible to reduce the size of a given treatment plant.

Another object is to reduce the cost of a given capacity water plant.

Yet another object is to increase the flow through existing plants.

Another object is to eliminate flocculation and settling basins from the water plant in many cases.

Other objects will become apparent as the invention is described in detail.

The foregoing objects are attained in the present invention by the provision of a filter bed comprising a continuously increasing number of particles of filter media per unit volume in the direction of filter flow, the bed having particles of at least three different specific gravities, the particles of each specific gravity being within a discrete size range, the relative size range being inverse with respect to the relative specific gravity of the particles, the largest particles being substantially no greater than —10 U.S. mesh sieve size.

Further details of the invention will be described hereinafter with reference to the accompanying drawing wherein.

Figure 1:
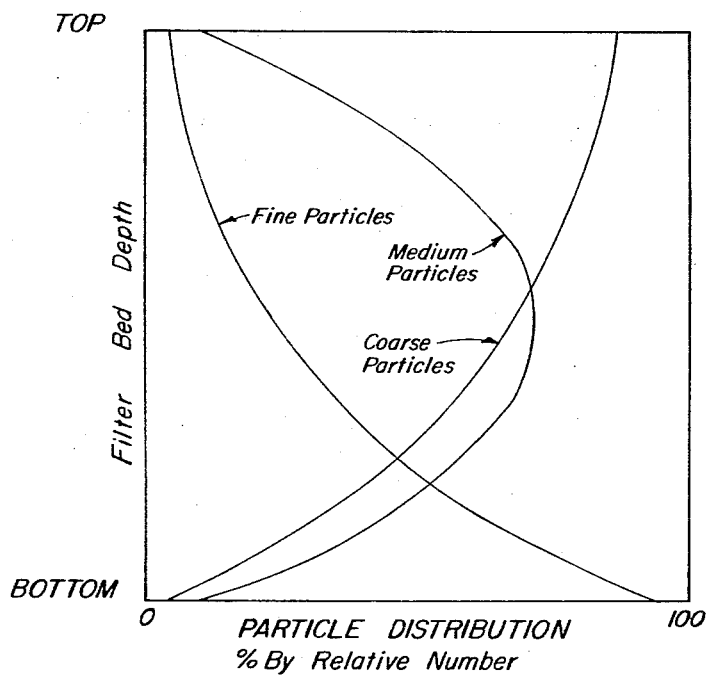
FIG. 1 is a graph illustrating certain features of the invention.

In filters provided heretofore with a multiple number of layers of material of differing fineness care has been taken to maintain the layers as discrete entities and to avoid mixing of the layers. This is directly contrary to the makeup of the filters of the present invention which requires that the media be intermixed. The intermixing is not, however, uniform which is in fact undesirable, but rather the mixing is such that the bed will have a progressively larger number of particles per unit volume in the direction of filter flow. This grading of particles is most easily attained by placing the particles of filter media which are to form the bed in the container therefor, the particles being selected with respect to size and specific gravity, and thereafter backwashing the bed until the particle distribution has reached a substantially constant orientation. If the particles selected comprise, for example, relatively large particles of a material of relatively low specific gravity, relatively small particles of a material of relatively high specific gravity and particles of intermediate size of an intermediate specific gravity the filter bed after backwashing will at its very top have a relatively large number of the large particles, a smaller number of the intermediate particles and a still smaller number of the finer particles. At an intermediate portion of the bed the intermediate particles will predominate in number and the larger and smaller particles would be fewer in number though the number of smaller particles would be greater than at the top. At the bottom of the filter the smaller particles would predominate in number, there would be fewer of the intermediate particles and still fewer of the larger particles. Graphically the particle distribution would be somewhat as shown in FIG. 1.

As will be appreciated the exact distribution of particles in any particular instance will depend upon the relative densities, particle size, particle shape and velocity of backwash.

The invention is particularly applicable to the use of materials of relatively fine particle size, the preferred range of particles being between about —10 +100 U.S. mesh size with at least some particles in the range from —40 +100 mesh. As indicated previously particles of three different specific gravities are required and in any filter there should be present a minimum of five percent of each material component.

The invention will now be further described with reference to specific examples of filter media utilized and bed composition.

Representative of the media which may be utilized in the construction of filter beds in accordance with the invention are the following:

Magnetite—a natural black iron mineral, usually expressed as $Fe_3O_4$, widely available.
Ilmenite—a natural black mineral, usually expressed as $FeO \cdot TiO_2$, widely available.
Garnet—a complex silicate mineral having the following approximate analysis:

| | |
|---|---|
| Hardness—(Mohs' scale) | 7.4–7.8 |
| Specific gravity | 4.5 |
| Iron oxide percent | 2.4 |
| Manganese oxide do | 11 |
| Aluminum oxide do | 15 |
| Silicon dioxide do | 36 |
| Magnesium oxide do | 3 |

Tabular alumina—heat processed aluminum oxide, widely available.
Graphitic rock—a silica rock containing graphite as an impurity and marketed under the trademark Graphilter.
Silica sand—the sand widely used for water filtration.
Anthracite coal—the coal widely used for water filtration.

*Example 1*

Figure 2:
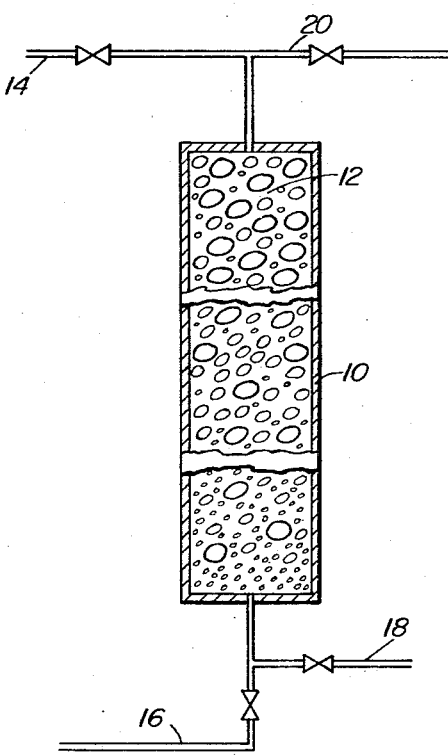
FIG. 2 is a schematic view illustrating a typical apparatus incorporating the invention.

A filter was prepared by adding filter media into a filter apparatus of the type illustrated in FIGURE 2 and comprising a container 10 for holding the media indicated at 12. The container is provided with an infeed line 14 through which the raw, turbid water may be fed and an effluent line 16 through which the filtered water may be removed. Lines 18, 20 are also provided for the addition and removal, respectively, of backwash water.

The media added was as follows, the percentages being by weight:

(a) 19.3% garnet of density 4.5 and size −40 +80 U.S. Series sieves.
(b) 21.0% graphitic rock of density 2.45 and size −20 +50 U.S. Series sieves.
(c) 59.7% anthracite coal of density 1.55 and size −10 +20 U.S. Series sieves.

The total depth of the filter media was 36 inches.
Following backwash at 15 g.p.m. per square foot the filter materials mixed and stratified approximately as shown in Table I, the figures being percent by weight.

TABLE I

| | Coal | Garnet | Graphitic Rock |
|---|---|---|---|
| Top 6" | 95 | 3 | 2 |
| Next 6" | 92 | 5 | 3 |
| Do | 88 | 8 | 4 |
| Do | 78 | 14 | 8 |
| Do | 5 | 35 | 60 |
| Do | 1 | 49 | 50 |

The filter of this example was run in a parallel test with a coal and sand filter comprising a twenty-four inch layer of −10 +20 mesh coal and a six inch layer of −30 +40 mesh sand. Water having a turbidity of 140 standard units was treated with 35 p.p.m. alum and 0.5 p.p.m. Separan NP–10, a polymer of acrylamide having recurring ionizable amide groups, and passed through the filters at a flow rate of five g.p.m. per square foot. The coal and sand filter broke through (passed turbid water exceeding 0.4 standard unit) after 6 hours when filtering at 5 g.p.m. per square foot. The filter of Example 1 under the same conditions ran for 11 hours before passing turbid water exceeding 0.4 standard unit.

Another test was run with raw water having a turbidity of 330 p.p.m. The sand-coal filter gave a run of 2⅝ hours, the filter of Example I gave a 5-hour run before turbidity reached 0.4 standard unit. In this instance the raw water was treated with 50 p.p.m. alum and 1.0 p.p.m. Separan NP–10, the water again being passed through the filters at five g.p.m. per square foot.

Another test was run on the filter of Example I with raw water having a turbidity of 630 p.p.m. A run of 3 hours was obtained before turbidity breakthrough occurred. Alum feed was 70 p.p.m., Separan NP–10 feed was 1.0, and the flow rate was five g.p.m. per square foot.

*Example 2*

A filter such as shown in FIGURE 2 was constructed by adding the following materials expressed as percent by weight:

(a) 21% garnet of density 4.5 and size −40 +80.
(b) 35% graphitic rock of density 2.45 and size −20 +50.
(c) 44% anthracite coal of density 1.55 and size −10 +20.

Total depth of filter was 30 inches. After adding the above materials to the column the filter was backwashed at fifteen g.p.m. per square foot until it appeared that a substantially constant orientation of the particles had been obtained. The particle distribution expressed as percent by weight was approximately as indicated in Table II.

TABLE II

| | Coal | Garnet | Graphitic Rock |
|---|---|---|---|
| Top 6" | 92 | 3 | 5 |
| Next 6" | 88 | 5 | 7 |
| Do | 37 | 12 | 51 |
| Do | 2 | 43 | 55 |
| Do | 1 | 42 | 57 |

This filter was tested on simultaneous runs with a sand filter comprising thirty inches of −10 +40 Muscanite sand and a coal-sand filter as described in Example 1. The raw water turbidity was 150 standard units, the alum feed 35 p.p.m., the Separan NP–10 feed 0.4 p.p.m., and the flow rate was 5 g.p.m. per square foot on all filters. The sand filter ran for 2 hours when the head loss reached 8 inches mercury. After 3½ hours, the flow through the sand filter stopped because the filter was completely plugged with turbidity. The sand-coal filter ran 6½ hours, when turbidity of 0.4 standard unit appeared in the effluent. However, our improved filter ran for 11¼ hours and was still producing good water with a head loss of 6⅞ inches of mercury at which time the run was terminated.

*Example 3*

Still another filter was constructed using media as follows:

(a) 7.8% garnet of density 4.5 size −40 +50.
(b) 6.1% magnetite of density 5.1 and size −40 +70.
(c) 8.2% ilmenite of density 4.7 and size −40 +70.
(d) 29.3% tabular alumina density 3.8 and size −50 +70.
(e) 18.6% silica sand of density 2.6 size −40 +50.
(f) 30.0% anthracite coal of density 1.55 and size −14 +20.

The depth of filter media was 30 inches. Again the media was backwashed at 15 g.p.m. per square foot and after analysis showed a particle distribution approximately as set for in Table III.

TABLE III

| | Coal | Garnet | Silica | Alumina | Ilmenite | Magnetite |
|---|---|---|---|---|---|---|
| Top 6" | 83 | 1 | 9 | 7 | 0 | 0 |
| Next 6" | 57 | 5 | 22 | 16 | 0 | 0 |
| Do | 20 | 10 | 45 | 25 | 0 | 0 |
| Do | 3 | 9 | 23 | 65 | 0 | 0 |
| Do | 2 | 8 | 4 | 46 | 20 | 20 |
| Do | 0 | 20 | 0 | 4 | 50 | 26 |

This filter was outstanding in its ability to remove turbidity without breakthrough. However, the head loss was relatively high. The filter ran for 9½ hours with raw water of 150 standard raw turbidity units. The filter effluent was 0.1 unit even at 16 inches of mercury head loss (end of run).

*Example 4*

Still another filter was made by adding the following materials expressed as percent by weight:

(a) 60% nylon of density 0.99 and size −10 +20.
(b) 20% polyethylene of density 0.94 and size −30 +50.
(c) 20% polyethylene of density 0.92 and size −30 +50.

This filter was operated as an upflow filter in the manner of British Provisional Patent No. 7,018/55.

The materials were mixed and stratified following backwash (which was of course in the downward direction) to give a bed with the bottom being mostly nylon followed by a mixture of nylon and polyethylene. Presumably, the two densities of polyethylene mixed to some extent but this was not determined. The filter was operated at 5 g.p.m per square foot with the flow being upward through the bed. The raw water turbidity was 150 standard units, the alum feed was 35 p.p.m., the Separan feed was 0.5 p.p.m. The turbidity of the effluent was less than 1 standard unit (the limit of measurement with the available apparatus). The filter operated for 2 hours with a head loss increase of less than ½ inch of mercury at which time the run was terminated.

*Example 5*

For many years it has been noted that filters pass muddy water if the flow rate changes rapidly or frequently. The improved filters of the invention are much more resistant to this effect than any other known filters. To compare the "surge resistance" of the filter of the invention simultaneous runs were made through a sand filter comprising 30 inches of 0.44 mm. effective size sand, a coal-sand filter comprising 24 inches of −10 +20 coal and 6 inches −30 +40 sand and a filter constructed in accordance with the invention having a total depth of 30 inches and comprising 30% garnet, −50 +70; 63% coal, −10 +20; and 7% graphitic rock, −20 +50.

All of the filters were given exactly the same treatment. The applied water turbidity was 135 standard units, the alum feed was 35 p.p.m., the Separan NP–10 feed was 0.8 p.p.m., and the filters had been operating for 3¾ hours at 5 g.p.m. per square foot. The flow was decreased to zero and then increased to 10 g.p.m. per square foot, then decreased to 5 g.p.m. per square foot, all within a period of 1 minute. The results are tabulated in Table IV.

TABLE IV.—SURGES

| | Effluent Turbidity Standard Units | | |
|---|---|---|---|
| | Sand filter | Sand-Coal filter | Invention filter |
| Time in minutes following flow surge: | | | |
| 0 | 0.11 | 0.11 | 0.09 |
| 1 | ¹10+ | ¹10+ | 0.35 |
| 2 | 10+ | 10+ | 0.30 |
| 3 | 10+ | 10+ | 0.21 |
| 4 | 10+ | 10+ | 0.15 |
| 10 | 10+ | 10+ | 0.10 |

¹ Off scale.

It will be noted from Table IV that the sand filter and the sand-coal filter could not withstand this severe treatment. The turbidity of the effluent went off scale in excess of 10 standard units. The filter of the invention showed a slight temporary increase in turbidity (from 0.09 to 0.35 unit) and then returned to normal within a 10-minute period.

*Example 6*

Another series of tests were run to compare the surge resistance of a filter of the invention constructed as described in Example 2 with a sand-coal filter comprising 24 inches −10 +20 coal and 6 inches −30 +40 sand. Both filters were treated in exactly the same way. Alum feed was 35 p.p.m., Separan NP–10 feed was 0.4 p.p.m., raw water turbidity was 150 standard units. After the filters had been operating for 9¾ hours at 5 g.p.m. per square foot they were surged as described in Example 5. The results are tabulated in Table V.

TABLE V.—SURGES

| | Effluent Turbidity | |
|---|---|---|
| | Sand-Coal filter | Invention filter |
| Time in Minutes following flow surge: | | |
| 0 | 2.1 | 0.10 |
| 1 | 10+ | 0.40 |
| 2 | 10+ | 0.30 |
| 3 | 10+ | 0.20 |
| 4 | 10+ | 0.20 |
| 10 | 10+ | 0.10 |

Just before the surge, the sand-coal filter had been passing turbid water for over 3 hours while the improved filter was passing clear water. Following the surge, the sand-coal filter effluent turbidity went off scale (over 10 standard units). The improved filter effluent turbidity went up slightly (from 0.10 to 0.40) and then returned to normal after 10 minutes.

The ability of our improved filters to withstand flow surges without an increase in effluent turbidity has significant value because in most plants flow surges do occur and with conventional filters do cause inferior quality water. The advantages of our improved filters in terms of improved water quality or obvious.

*Example 7*

A filter was prepared comprising 16 percent garnet of −40 +100 mesh, 21 percent graphitic rock of −20 +50 mesh and 63 percent coal of −10 +20 mesh the total bed depth being sixty inches. After backflow to secure the desired particle distribution water having a turbidity of 1100 p.p.m. was passed through the bed at a flow rate of 5 g.p.m. per square foot after adding 90 p.p.m. alum and 0.5 p.p.m. Separan NP–10. The run continued for 4.0 hours before turbidity breakthrough occurred at which time the head loss was 15 inches of mercury. This run demonstrated the ability of the filter to cope with water of high turbidity.

Having illustrated and described a preferred embodiment of the invention, it should be apparent of those skilled in the art that the invention permits of modification in arrangement and details. We claim as our invention all such modification as come within the true spirit and scope of the following claims.

We claim:
1. A filter for filtration of water comprising:
   a bed having a continually increasing number of particles per unit area in the direction of water flow through the bed;
   said particles comprising intermixed filter media of at least three different specific gravities;
   there being at least five percent by weight of a media of each specific gravity present.
2. A filter as set forth in claim 1 comprising particles grading in size from about −10 to +100 U.S. mesh size.
3. A filter as set forth in claim 1 having a total depth of at least about 24 inches and comprising between about 7 to 30 percent by weight garnet particles of between about −40 +100 mesh; between about 7 to 35 percent by weight graphitic rock of between about −20 +50 mesh; and between about 30 to 65 percent by weight anthracite of between about −10 +20 mesh.

4. A filter as set forth in claim 1 having a depth of about sixty inches and comprising about 16 percent garnet of between about −40 +100 mesh; 21 percent graphitic rock of between about −20 +50 mesh; and 63 percent anthracite of between about −10 +20 mesh.

5. A filter for filtration of water comprising a bed having a continually increasing number of particles per unit area in the direction of water flow through the bed;

said bed comprising particles of filter media of at least three different specific gravities;

the particles of each specific gravity being within a discrete size range;

the relative size range being inverse with respect to the relative specific gravity of the particles;

said particles having a maximum size of about −10 U.S. sieve.

6. The method of forming a filter bed for the clarification of water comprising the steps of
(1) providing an elongate container through which filter flow of water in the vertical direction may take place,
(2) placing in said container a plurality of particles of filter media having three different specific gravities sufficient to provide a column of media having a total depth of at least about twenty-four inches,
  (a) the particles of greatest specific gravity being garnet of a size of between about −40 +100 U.S. mesh,
  (b) the particles of least specific gravity being anthracite of a size of between about −10 +20 U.S. mesh,
  (c) the particles of intermediate specific gravity being graphitic rock of a size of between about −20 +50 U.S. mesh,
  (d) said bed having at least 7 percent by weight of particles of each said specific gravity,
(3) flowing water upwardly through said container at a rate sufficient substantially to fluidize said particles and continuing said flow of water for a period of time sufficient to obtain a substantially constant orientation of particles in said column,
(4) ceasing said flow of water upwardly through said bed and permitting the particles of said bed to settle.

References Cited

UNITED STATES PATENTS 293,745  2/1884  Hyatt _____ 210—290

SAMIH N. ZAHARNA, *Primary Examiner.*

UNITED STATES PATENT OFFICE
CERTIFICATE OF CORRECTION

Patent No. 3,343,680                            September 26, 1967

Archie H. Rice et al.

It is hereby certified that error appears in the above numbered patent requiring correction and that the said Letters Patent should read as corrected below.

In the heading to the printed specification, lines 4 and 5, for "General Services Company, Corvallis, Oreg." read -- Neptune Microfloc, Incorporated --; column 1, line 70, after "given" insert -- water --; column 3, line 12, for "2.4" read -- 24 --; column 4, line 64, for "for" read -- forth --; column 5, TABLE 1V, fourth column, line 4 thereof, for "0 21" read -- 0.20 --; column 6, line 40, for "or" read -- are --.

Signed and sealed this 15th day of October 1968.

(SEAL)
Attest:

Edward M. Fletcher, Jr.                        EDWARD J. BRENNER

Attesting Officer                                  Commissioner of Patents